US008425787B2

(12) United States Patent
Pan et al.

(10) Patent No.: US 8,425,787 B2
(45) Date of Patent: Apr. 23, 2013

(54) INKJET PRINTHEAD BRIDGE BEAM FABRICATION METHOD

(75) Inventors: Alfred I-Tsung Pan, Sunnyvale, CA (US); Kenneth Vandenberghe, Junction City, OR (US); Dennis Lazaroff, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 656 days.

(21) Appl. No.: 12/548,397

(22) Filed: Aug. 26, 2009

(65) Prior Publication Data

US 2011/0049092 A1 Mar. 3, 2011

(51) Int. Cl.
*G01D 15/00* (2006.01)

(52) U.S. Cl.
USPC ............... 216/27; 257/415; 438/21; 438/667; 438/691; 438/692

(58) Field of Classification Search .................... 347/63, 347/18, 56; 216/27; 430/320; 438/21
See application file for complete search history.

(56) References Cited

U.S. PATENT DOCUMENTS 4,791,435 A 12/1988 Smith et al.
4,894,664 A 1/1990 Tsung Pan
6,000,787 A 12/1999 Weber et al.
6,003,977 A 12/1999 Weber et al.
6,019,907 A 2/2000 Kawamura
6,065,823 A 5/2000 Kawamura
6,113,221 A 9/2000 Weber
6,137,443 A 10/2000 Beatty et al.
6,302,523 B1 10/2001 Smith et al.
6,305,790 B1 10/2001 Kawamura et al.
6,402,301 B1 6/2002 Powers et al.
6,497,141 B1 12/2002 Turner et al.
6,534,247 B2 3/2003 Milligan et al.
6,627,467 B2 * 9/2003 Haluzak et al. ................. 438/21
6,719,913 B2 4/2004 Conta et al.
6,764,605 B2 7/2004 Donaldson et al.
6,929,352 B2 8/2005 Silverbrook
6,974,548 B2 12/2005 Giere et al.
2002/0020053 A1 * 2/2002 Fonash et al. ................ 29/623.1
2003/0186474 A1 * 10/2003 Haluzak et al. ................. 438/21
2004/0187292 A1 * 9/2004 Miller et al. .................... 29/594
2006/0292866 A1 * 12/2006 Borwick et al. .............. 438/667
2007/0278600 A1 * 12/2007 Zhan et al. .................... 257/415

OTHER PUBLICATIONS

Shaw et al. Sensors and Actuators A, 40 (1994) 63-70, SCREAM I: A single mask, single-crystal silicon, reactive ion etching process for microelectromechanical structures, pp. 63-69.*
Gary K. Fedder, "MEMS Fabrication," ITC International Test Conference, IEEE, 2003, paper 27.3, pp. 691-698.

* cited by examiner

*Primary Examiner* — Duy Deo
*Assistant Examiner* — Erin Flanagan

(57) ABSTRACT

A method of fabricating a bridge beam of an inkjet printhead employs a cavity formed under the bridge beam and an etch-stop layer that limits a back-surface recess formation. The method includes forming a cavity that connects between a bottom of a pair of trenches in and extending from a front surface of a substrate and depositing an etch-stop layer at a bottom of the cavity. The method further includes forming a recess in a back surface of the substrate, the recess exposing the etch-stop layer and the etch-stop layer limiting a depth of the formed recess. The method further includes removing the exposed etch-stop layer to connect the cavity and the recess, the bridge beam being a portion of the substrate above the formed cavity and between the trenches.

19 Claims, 6 Drawing Sheets

INKJET PRINTHEAD BRIDGE BEAM FABRICATION METHOD

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printers and related inkjet devices have proven to be reliable, efficient, and generally cost effective means for the accurate delivery of precisely controlled amounts of ink and other related liquid materials onto various substrates such as, but not limited to, glass, paper, cloth, transparencies and related polymer films. For example, modern inkjet printers for consumer market digital printing on paper offer printing resolutions in excess of 2400 dots per inch (DPI), provide printing speeds greater than 20-30 sheets per minute, and deliver individual droplets of ink in a ‘drop-on-demand’ method that are often measured in picoliters. The relatively low costs, high print quality and generally vivid color output provided by these modern inkjet printers has made these printers the most common digital printer in the consumer market. Currently, in addition to the consumer market, there is considerable interest in employing inkjet printing for high-speed commercial and industrial applications.

In general, inkjet printheads used for drop-on-demand inkjet printers and related inkjet printing systems may employ one of at least two technologies for ejecting droplets of ink. A first of these technologies employs a piezoelectric effect or a piezoelectric-based ejector element to eject the droplets from the printhead. The second of these technologies, often referred to as thermal inkjet printing, employs localized heat produced by the ejector element to vaporize a portion of the ink. A bubble produced by the vaporization expands to eject a remaining portion of the ink from the inkjet printhead as the droplet.

Inkjet printheads that feature a bridge beam architecture offer a number of advantages over conventional printhead architectures, especially with respect to maximum printing speeds (i.e., firing rates) and thermal management. Unfortunately existing manufacturing methodologies employed in the fabrication of inkjet printhead such as backside etching pose difficulties with respect to controlling tolerances during fabrication of the bridge beam. Other fabrication methodologies including the use of silicon-on-insulator (SOI) substrates while offering potentially better manufacturing tolerance control may be unnecessarily expensive. In addition, the use of an insulator layer in a substrate used for fabrication of the inkjet printhead may defeat some of the thermal advantages of using a bridge beam.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

Figure 1:
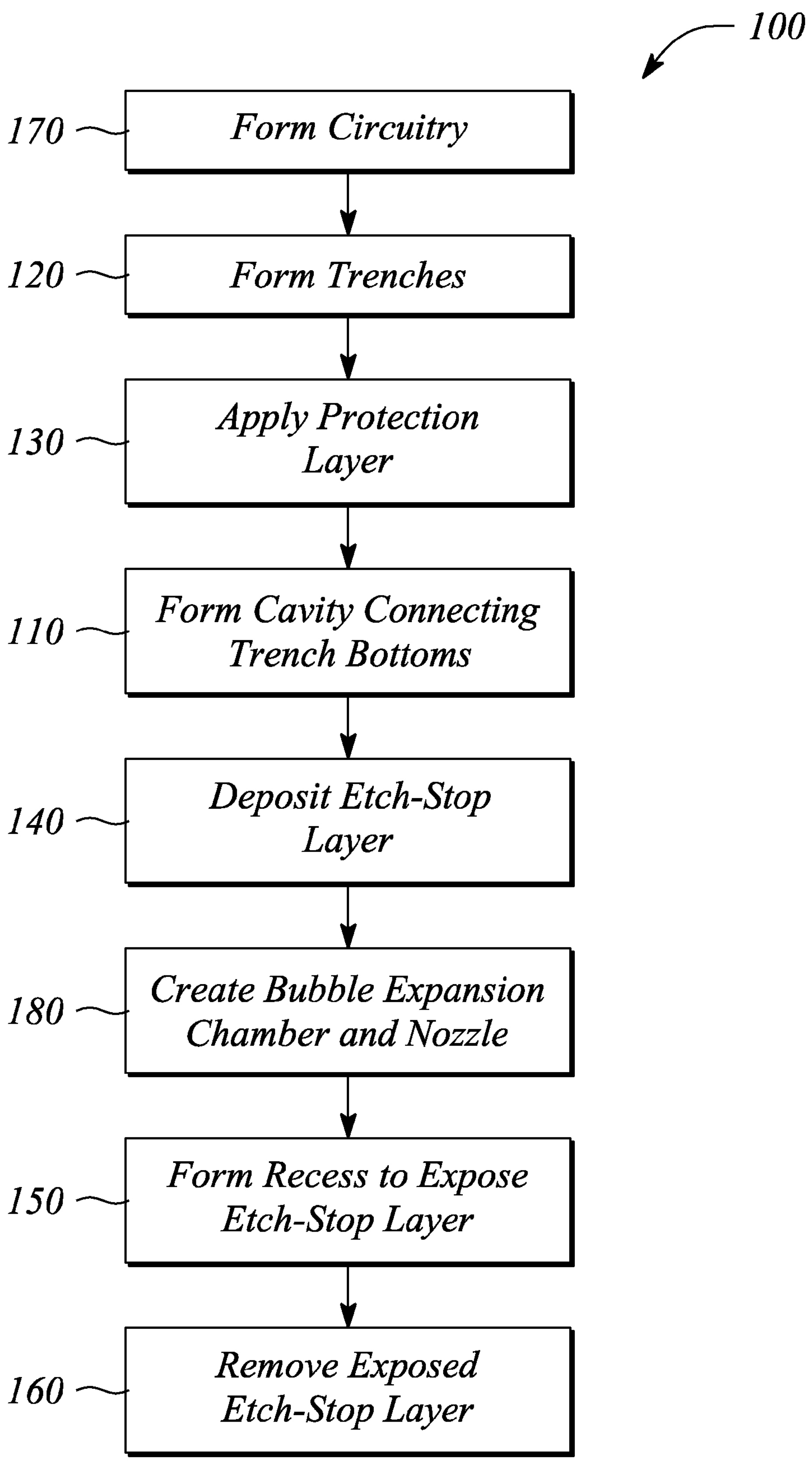
FIG. 1 illustrates a flow chart of a method of fabricating a bridge beam of an inkjet printhead, according to an embodiment of the present invention.

Certain embodiments of the present invention have other features that are one of in addition to and in lieu of the features illustrated in the above-referenced figures. These and other features of the invention are detailed below with reference to the preceding drawings.

DETAILED DESCRIPTION

Embodiments of the present invention facilitate fabrication of an inkjet printhead having a bridge beam architecture. In particular, manufacturing tolerances associated with forming a bridge beam of an inkjet printhead may be tightly controlled, according to various embodiments. Further, the inkjet printhead having a bridge beam may be realized using a monolithic substrate. The use of a monolithic substrate may improve thermal characteristics of the inkjet printhead as well as yield an inkjet printhead that is less costly to fabricate. Moreover, according to various embodiments, the fabrication methodologies associated with the bridge beam based inkjet printhead described herein are compatible with mainstream semiconductor fabrication.

In various embodiments of the inkjet printhead that may be fabricated according to the present invention, an ejection element ejects ink as droplets from a nozzle of the printhead. The ejection element (e.g., a resistive heater) is typically located in a bubble expansion chamber below the nozzle. In some embodiments, the ejector element forms a bubble in the bubble expansion chamber. For example, the ejector element may comprise a resistive heater that vaporizes a portion of the ink to form the bubble. The bubble formed by the ejector element expands to eject the ink. In other embodiments, another mechanism other than or in addition to an expanding bubble may be employed by the ejector element to eject the ink (e.g., a piezo-electric actuator or a micromechanical lever actuator). Regardless, herein a chamber over the ejector element and below the nozzle that holds ink for ejection by the inkjet printhead is referred to and defined as the 'bubble expansion chamber' whether or not an actual expanding bubble is employed to eject the ink.

Ink for ejection by the inkjet printhead is supplied to the bubble expansion chamber from an ink reservoir through a plurality of ink feed channels. In some embodiments, the ink reservoir is in direct communication with the bubble expansion chamber through or by way of the ink feed channels. For example, an input of the ink feed channel may be connected directly to the ink reservoir while an output is connected to the bubble expansion chamber. In other embodiments, another structure such as, but not limited to, a feed transition chamber may be located between the ink reservoir and the input of the ink feed channel. The feed transition chamber may facilitate cooling of the inkjet printhead, for example. In such embodiments, the ink feed channels are indirectly connected to the ink reservoir through the feed transition chamber, for example.

Further, according to various embodiments, the inkjet printhead may comprise a pair of lateral ink feed channels. The lateral ink feed channels are spaced apart from one another. In some embodiments, the inkjet printhead may further comprise a central ink feed channel disposed between the lateral ink feed channels.

The inkjet printhead that may be fabricated according to embodiments of the present invention exhibits a bridge beam architecture. The bridge beam is a structure that spans from a back to a front of the bubble expansion chamber. As such, the bridge beam effectively forms a bottom or a floor of the bubble expansion chamber, according to some embodiments. For example, sides of the bridge beam and therefore its width may be delineated or defined by the lateral ink feed channels. In particular, a pair of lateral ink feed channels may delineate a first side and a second side of the bridge beam. In such embodiments, the printhead comprises a bridge beam that supports the ejector element within the bubble expansion chamber. When present, the central ink feed channel may penetrate, and in some embodiments effectively bisect, the bridge beam.

In some embodiments, the bridge beam further separates the bubble expansion chamber from an ink chamber or ink reservoir. In particular, a top of the ink reservoir is in contact with a bottom of the bridge beam, in some embodiments. As such, a thickness of the bridge beam may effectively establish a distance between the ink reservoir and the bubble expansion chamber. As has already been discussed, in some embodiments, a feed transition chamber that facilitates cooling of the thermal inkjet printhead may be located between the ink reservoir and the bridge beam. In such embodiments, the thickness of the bridge beam may effectively establish a distance between the feed transition chamber and the bubble expansion chamber.

A substrate is employed to realize the inkjet printhead during fabrication, in various embodiments. In particular, according to various embodiments the inkjet printhead is fabricated in or from the substrate. Herein, a substrate is defined as a structure having a front side and a backside, the backside being defined as a side of the substrate opposite the front side. In some embodiments, the substrate may comprise a semiconductor material. For example, the substrate may comprise silicon (Si). The exemplary Si substrate may include Si that is either single crystalline, polycrystalline, or amorphous, for example. In some embodiments, the substrate may further comprise one or more of oxides and metals.

The bridge beam may comprise a material (e.g., silicon) of the body of the printhead, in some embodiments. For example, the bridge beam may comprise a material of the substrate from which the inkjet printhead is manufactured. In other embodiments, the bridge beam may comprise other materials in addition to the substrate material. For example, the bridge beam may further comprise a metal such as, but not limited to copper (Cu) or tungsten (W). In another example, the bridge beam may further comprise an oxide such as, but not limited to, silicon dioxide ($SiO_2$).

As used herein, the article 'a' is intended to have its ordinary meaning in the patent arts, namely 'one or more'. For example, 'a trench' generally means one or more trenches and as such, 'the trench' means 'the trench(es)' herein. Also, any reference herein to 'front', 'back', 'top', 'bottom', 'upper', 'lower', 'up', 'down', 'left' or 'right' is not intended to be a limitation herein but, is employed to establish a relative condition or location. Furthermore, terms such as 'about' and 'approximately' generally refer to a tolerance of ±10% about a value to which the term is applied unless otherwise specified herein. Moreover, examples herein are intended to be illustrative only and are presented for discussion purposes and not by way of limitation.

FIG. 1 illustrates a flow chart of a method 100 of fabricating a bridge beam of an inkjet printhead, according to an embodiment of the present invention. The method 100 of fabricating facilitates production of a bridge beam having relatively precise dimensions. In particular, the method 100 of fabricating may enable precision control of a thickness of the bridge beam.

The method 100 of fabricating a bridge beam comprises forming 110 a cavity in and below a front surface of a substrate. The cavity, once formed 110, connects between a bottom of a pair trenches in and extending from the substrate front surface. The trenches are generally spaced apart from one another and may be effectively parallel to one another. The bridge beam comprises a portion of the substrate above the formed 110 cavity and between the trenches. Further, the forming 110 the cavity produces a cavity or open space that is buried below the front surface of the substrate. As such, by definition the cavity resulting from forming 110 is defined as a 'buried cavity.' Moreover, the cavity resulting from forming 110 establishes a bottom of the bridge beam. As such, the bridge beam has a thickness that can be controlled, in part, by a depth of the pair of trenches.

Forming 110 the cavity generally comprises removing material of the substrate at a bottom of the trenches. According to various embodiments of the present invention, the removing the substrate material at the bottom of the trenches is performed from a front side of the substrate through the trenches. In particular, the trenches provide access to the substrate material that is being removed. Further, removal of the substrate material is performed in a vicinity local to the trench bottoms. Removal of substrate material from the bottom of the trenches initially produces an open region or chamber at or in a vicinity of the bottom of the trenches. The chamber is subsequently enlarged through further substrate material removal. The enlargement expands the chambers toward one another as removal continues until chambers of the trenches merge and the cavity connecting the pair of trenches is formed 110.

Removal of the substrate material may be an isotropic removal, according to some embodiments. Isotropic removal expands the chambers isotropically or nearly isotropically. Alternatively, the substrate material may be removed from the vicinity of the bottom of the trenches in an anisotropic manner comprising a lateral component of the removal. The lateral component of removal is such that the cavity connecting between the pair of trenches is eventually formed 110. For example, in a first trench the lateral removal component may be generally in a direction of or toward another trench bottom.

In some embodiments, walls of the trenches may be coated with a protective coating or protection layer prior to forming 110 the cavity. The protective coating may effectively focus material removal associated with the forming 110 to and in the vicinity of the trench bottoms while minimizing any material removal from the trench walls. Protecting the trench walls during forming 110 is discussed in more detail below.

In some embodiments, forming 110 the cavity comprises employing a wet etch. For example, when the substrate comprises silicon (Si), the wet etch may use tetramethylammonium hydroxide (TMAH) as an etchant. An aqueous solution containing between about 5 weight-percent (wt %) and about 25 wt % of TMAH at a temperature of between about 70 degrees centigrade (° C.) and about 90° C. may be introduced into the trenches to etch the trench bottoms to remove material from the Si substrate, for example. Such a TMAH-based wet etch of Si preferentially etches at a much faster rate in both of a (100)-direction and a (110)-direction as compared to etch rates in a (111)-direction, especially at higher temperatures. As a result, exposing trench bottoms to the TMAH-based wet etch results in formation 110 of chambers and ultimately a cavity that preferentially leaves (111) crystallographic planes or facets exposed inside the cavity. As such, the anisotropic wet etch provided by aqueous TMAH etchant may include the aforementioned lateral component of material removal. In particular, by appropriate choice of a crystal orientation of the Si substrate, a cavity that connects the trench bottoms to one another may be formed 110 using TMAH-based wet etching. Other wet etchants including, but not limited to, a potassium hydroxide (KOH) may be employed to perform wet etching in forming 110 the cavity.

Figure 2A:
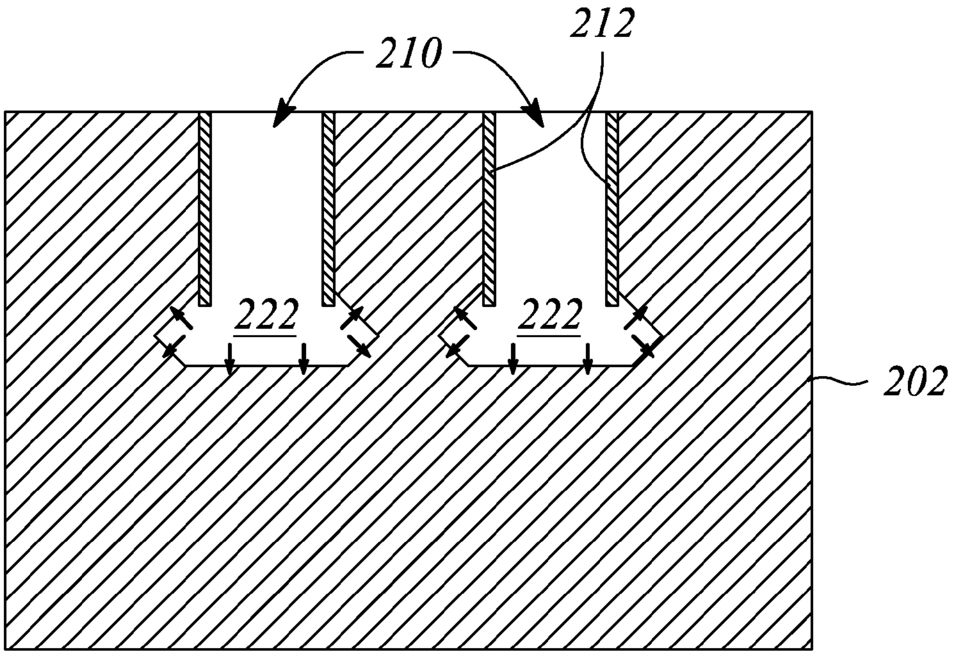
FIG. 2A illustrates a cross sectional view of an exemplary substrate during an initial stage of forming a cavity using a wet etch, according to an embodiment of the present invention.

FIG. 2A illustrates a cross sectional view of an exemplary substrate 202 during an initial stage of forming 110 a cavity using a wet etch, according to an embodiment of the present invention. In particular, FIG. 2A illustrates an early stage of forming 110 a cavity in an exemplary Si substrate 202 using a wet etch through a pair of parallel trenches 210. The trenches 210 are in and extend from a front surface of the exemplary substrate 202, as illustrated.

The wet etch of FIG. 2A may employ TMAH in an aqueous solution as an etchant, for example. As illustrated, action of the TMAH-based etchant introduced into the trenches removes substrate material (as indicated by heavy arrows) from a bottom of the trenches. In particular, the etchant etches preferentially in (100)-directions and (110)-directions to expose (111)-facets of the Si substrate 202. The removal of the substrate material initially creates small chambers 222 that are localized to a vicinity of the trench bottoms. Further as illustrated, a protective coating 212 on the walls of the trenches 210 may effectively prevent the etchant from attacking and removing material from the trench walls away from the trench bottoms.

Figure 2B:
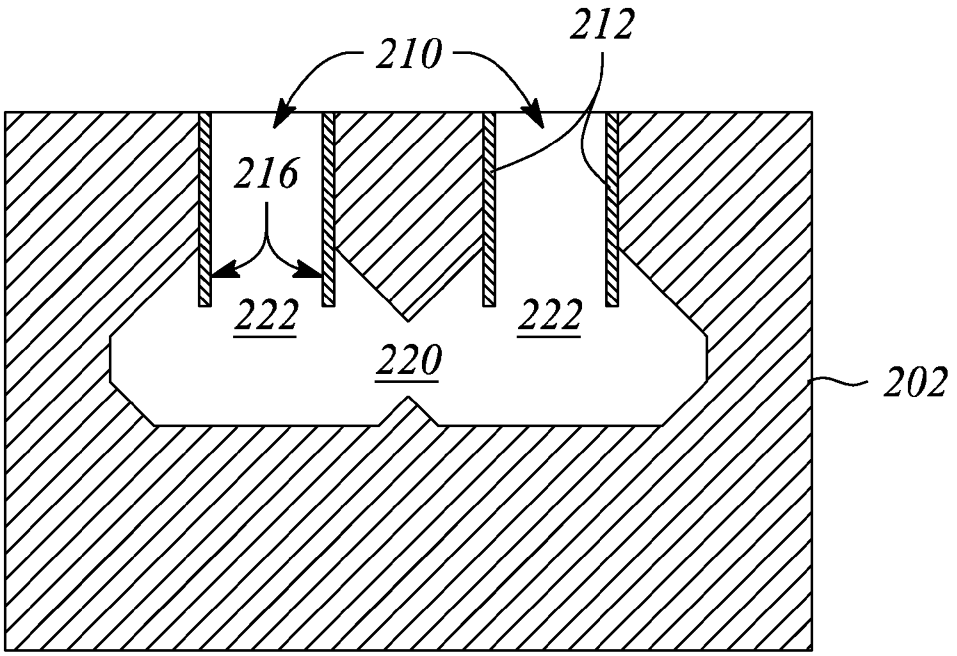
FIG. 2B illustrates a cross sectional view of the exemplary substrate illustrated in FIG. 2A during a later stage of forming a cavity, according to an embodiment of the present invention.

FIG. 2B illustrates a cross sectional view of the exemplary substrate 202 illustrated in FIG. 2A during a later stage of forming 110 a cavity, according to an embodiment of the present invention. In particular, the chambers 222 illustrated in FIG. 2B have been expanded by further action of the etchant to a point where the individual chambers 222 associated with each of the trenches 210 have merged. The merged chambers 222 create or effectively become the cavity 220 that is the result of forming 110 a cavity.

In other embodiments, forming 110 the cavity comprises employing an isotropic dry etch. When the bottoms of the trenches are exposed to an isotropic dry etch, the isotropic nature of an isotropic dry etch results in formation of a chamber that expands effectively in all directions from the bottom of the trenches. As the chambers at the bottom of each of the trenches expand, the chambers eventually connect to form 110 the cavity that connects between the trench bottoms.

For example, an isotropic xenon-difluoride ($XeF_2$) dry etch may be employed. A dry etch using $XeF_2$ (e.g., in a gaseous form) may be performed in a vacuum chamber by introducing the $XeF_2$ gas into the bottom of the trenches. The $XeF_2$-based dry etch creates chambers at the trench bottoms. The chambers expand from the bottom of the trenches in a generally isotropic manner with further exposure to $XeF_2$. The expanding chambers eventually connect to form 110 the cavity that connects between the trenches.

Figure 3A:
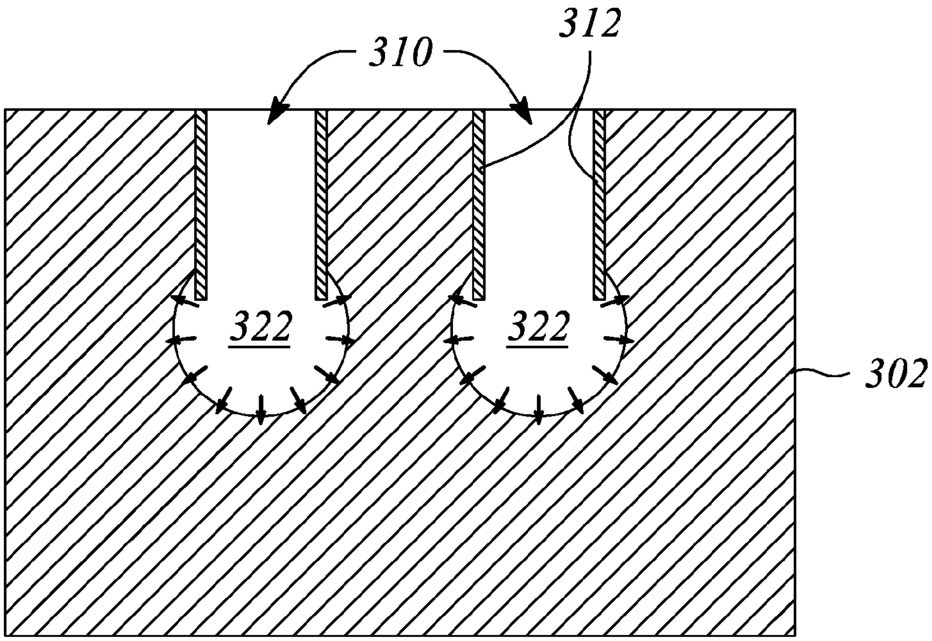
FIG. 3A illustrates a cross sectional view of an exemplary substrate during an initial stage of forming a cavity using an isotropic dry etch, according to an embodiment of the present invention.

FIG. 3A illustrates a cross sectional view of an exemplary substrate 302 during an initial stage of forming 110 a cavity using an isotropic dry etch, according to an embodiment of the present invention. In particular, FIG. 3A illustrates an early stage of forming 110 a cavity in an exemplary Si substrate 302 using a $XeF_2$ dry etch. The XeF2 dry etch is performed in a pair of parallel trenches 310 in and extending from a front surface of the exemplary substrate 302, as illustrated. The $XeF_2$ dry etch of FIG. 3A removes substrate material isotropically from a vicinity of the bottom of the trenches, as indicated by heavy arrows in FIG. 3A. The removal of the substrate material initially creates small chambers 322. Further as illustrated, a protective coating 312 on the walls of the trenches 310 may effectively prevent the isotropic dry etch from attacking and removing material from the trench walls away from a vicinity of the trench bottoms.

Figure 3B:
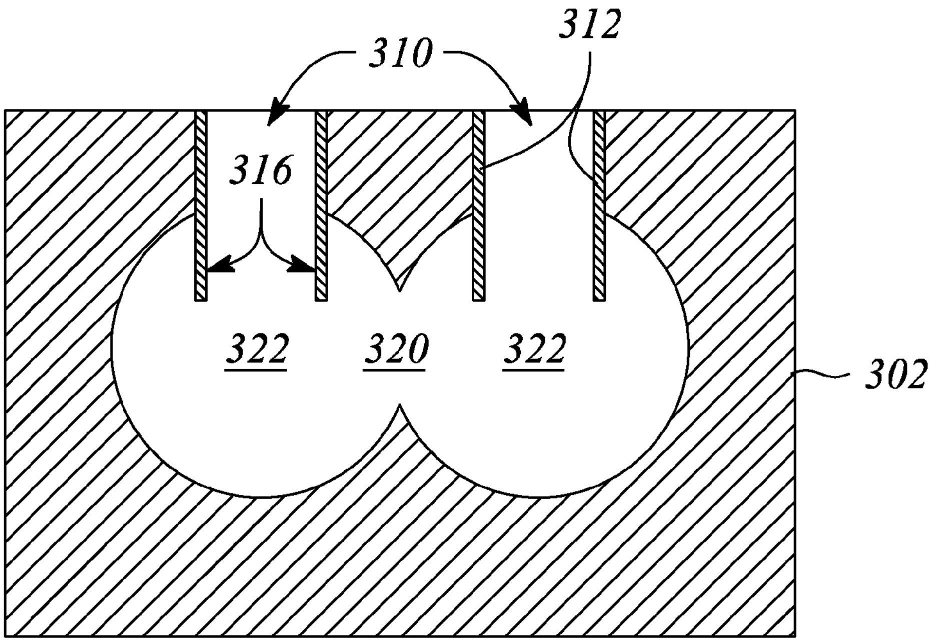
FIG. 3B illustrates a cross sectional view of the exemplary substrate illustrated in FIG. 3A during a later stage of forming a cavity, according to an embodiment of the present invention.

FIG. 3B illustrates a cross sectional view of the exemplary substrate 302 illustrated in FIG. 3A during a later stage of forming 110 a cavity, according to an embodiment of the present invention. In particular, as illustrated the chambers 322 have expanded and merged by further action of the $XeF_2$ dry etch to yield or effectively become the cavity 320 of forming 110 a cavity.

Referring again to FIG. 1, the method 100 of fabricating a bridge beam further comprises forming 120 the pair of trenches, according to some embodiments. In particular, the trenches may be formed 120 in the front surface of the substrate prior to forming 110 a cavity. In general, a depth of the trenches determines a thickness of the bridge beam. A thickness of the bridge beam may be between about 10 microns (em) and 100 μm, for example. Further, the trenches may serve as ink feed channels that supply ink from an ink reservoir to a bubble expansion chamber of the inkjet printhead, once the inkjet printhead is completed. As such, the trenches may be relatively narrow (e.g., have a high length to width aspect ratio), according to some embodiments. For example, the trenches may have a width of about 10 μm and a trench length of about 40 μm and a depth of 100 μm. In other embodiments, the substrate may be provides with the trenches so forming 120 is not performed.

In some embodiments, a front-side dry etch may be employed to form 120 the pair of trenches. Exemplary front-side dry etch methods include, but are not limited to, reactive ion etching (RIE). In some embodiments, especially where the desired aspect ratio of the formed 120 trenches is very high, the front-side etch used in forming 120 the pair of trenches may comprise employing a Bosch dry etch. In some embodiments, more than a single pair of trenches are formed 120.

In some embodiments, the method of fabricating a bridge beam further comprises applying 130 a protection layer to a sidewall of the formed trenches. For example, the protection layer may protect the sidewall from being etched by an etchant used during forming 110 a cavity. Thus, the protection layer protects against an action of an etchant or other means of forming 110 the cavity. The protection layer may be applied 130 to all of the sidewalls of the pair of trenches, for example.

In some embodiments, applying 130 a protection layer comprises applying a conformal thin film to surface of the trenches. Applying a conformal thin film may deposit the thin film on a bottom surface as well as to surfaces of the sidewalls, for example. Applying 130 a protection layer may further comprise selectively removing the applied conformal thin film from a bottom surface of the trenches.

For example, the applied 130 conformal thin film may comprise tetraethyl orthosilicate (TEOS). The TEOS thin film may be applied 130 using one or more of low-pressure chemical vapor deposition (LPCVD) and atomic layer deposition (ALD). Selectively removing the applied conformal thin film (e.g., TEOS) may be accomplished using a directional etch (e.g., RIE or laser ablation). Other oxides (e.g., a thermal oxide) as well as various polymers that may resist the effects of materials used in forming 110 a cavity may also be employed as the conformal thin film that is applied 130 as the protection layer.

In some embodiments, a depth of the trenches may be increased following selective removal of the conformal thin film from the bottom surface. Increasing the depth may be accomplished in a manner similar to that described above for forming 120 the trenches, for example. Increasing the depth exposes portions of the trench sidewalls below the protection layer and may facilitate lateral removal of substrate material during cavity formation 110.

Figure 4A:
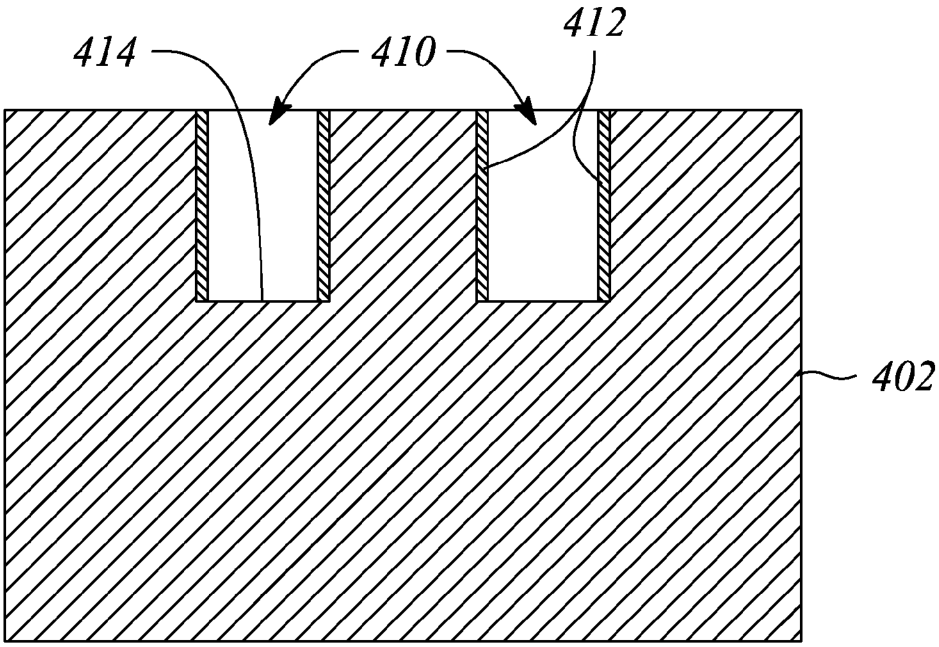
FIG. 4A illustrates a cross sectional view of a substrate with a pair of trenches in and extending from a front surface of the substrate, according to an embodiment of the invention.
Figure 4B:
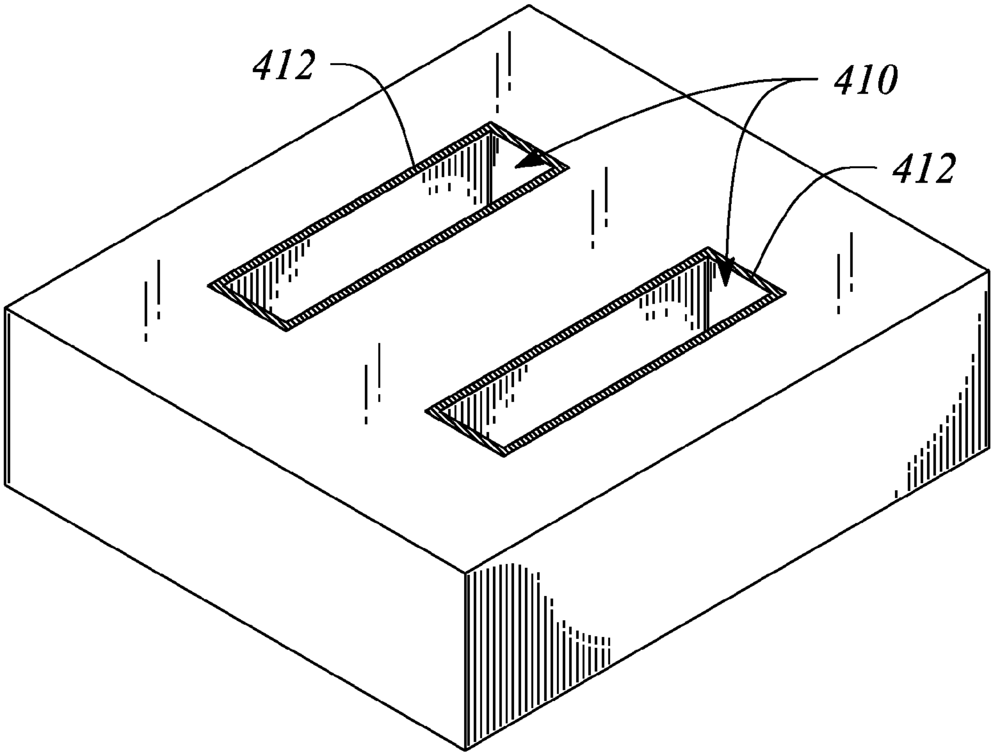
FIG. 4B illustrates a perspective view of the substrate illustrated in FIG. 4A, according to an embodiment of the present invention.

FIG. 4A illustrates a cross sectional view of a substrate 402 with a pair of trenches 410 in and extending from a front surface 404 of the substrate 402, according to an embodiment of the invention. FIG. 4B illustrates a top perspective view of the substrate 402 illustrated in FIG. 4A, according to an embodiment of the present invention. Also illustrated in FIGS. 4A and 4B is a protection layer 412 on walls of the trenches 410. The bottoms 414 of the trenches are without a protection layer 412, as illustrated. In particular, FIG. 4A illustrates the trenches after forming 120 the pair of trenches as well as after applying 130 a protection layer 412 to a sidewall (e.g., all sidewalls) of the formed 120 trenches. Further as illustrated, the bottoms 414 of the trenches may be without the protection layer 412 as a result of selectively removing an applied conformal thin film from the trench bottoms, for example.

In some embodiments, the protection layer 412 may effectively hang down into the cavity 420 as a 'curtain,' after forming 110 a cavity. Referring again to FIGS. 2B and 3B, the protection layer 212, 312 is illustrated on the walls of the trenches. Further illustrated is the curtain 216, 316 formed by the protection layer 212, 312 that extends beyond an edge of the cavity 220, 320 that is formed 110 at the trench bottoms.

Referring again to FIG. 1, the method of fabricating 100 a bridge beam further comprises depositing 140 an etch-stop layer at a bottom of the formed 110 cavity (i.e., buried cavity). The etch-stop layer may comprise TEOS deposited by LPCVD or ALD, for example. As a result of depositing 140, the etch-stop layer effectively coats a bottom of the cavity and resists effects of materials (e.g., etchants) employed in forming a recess (see below). Other oxides and polymer materials that act as an etch-stop may be employed as the deposited 140 etch-stop layer, in addition to or instead of TEOS, for example.

The method of fabricating 100 a bridge beam further comprises forming 150 a recess in a back surface of the substrate. The formed recess exposes the etch-stop layer. In particular, forming 150 the recess proceeds until reaching the etch-stop layer from the backside of the substrate. The etch-stop layer effectively halts or limits further recess-forming 150. For example, forming 150 a recess may comprise employing a wet etch of a combination of laser etching followed by a wet etch. Depth control of etching employed in forming 150 is relatively non-critical since the etch-stop layer establishes an ultimate depth of the recess being formed 150. That is, forming 150 a recess continues until the etch-stop layer is reached. Further since forming 150 a recess stops at the etch-stop layer, the etch-stop layer is effectively exposed to a back surface of the substrate by virtue of the formed 150 recess.

The method of fabricating 100 a bridge beam further comprises removing 160 the exposed etch-stop layer to connect the cavity to the recess. In particular, removal 160 of the etch-stop layer effectively removes a barrier (i.e., the etch-stop layer) that previously separated the formed 150 recess and the formed 110 cavity. In some embodiments, removing 160 the exposed etch-stop layer is performed from a backside of the substrate. For example, an etchant that attacks the etch-stop layer may be employed in removing 160. A dry etch may be used to remove an etch-stop layer comprising TEOS, for example.

Figure 5A:
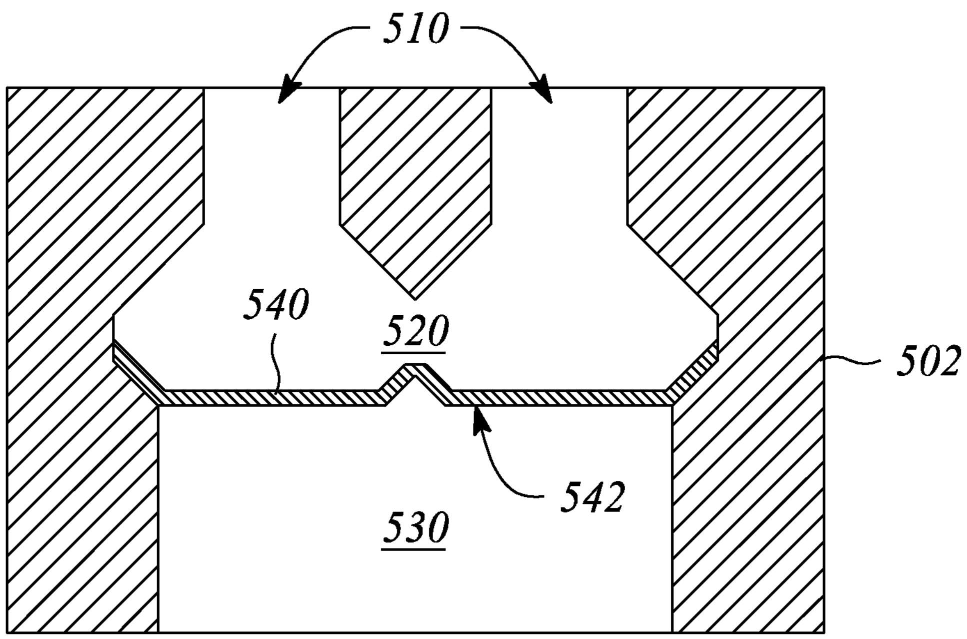
FIG. 5A illustrates a cross sectional view of an exemplary substrate having a cavity and recess separated by an etch-stop layer, according to an embodiment of the present invention.
Figure 5B:
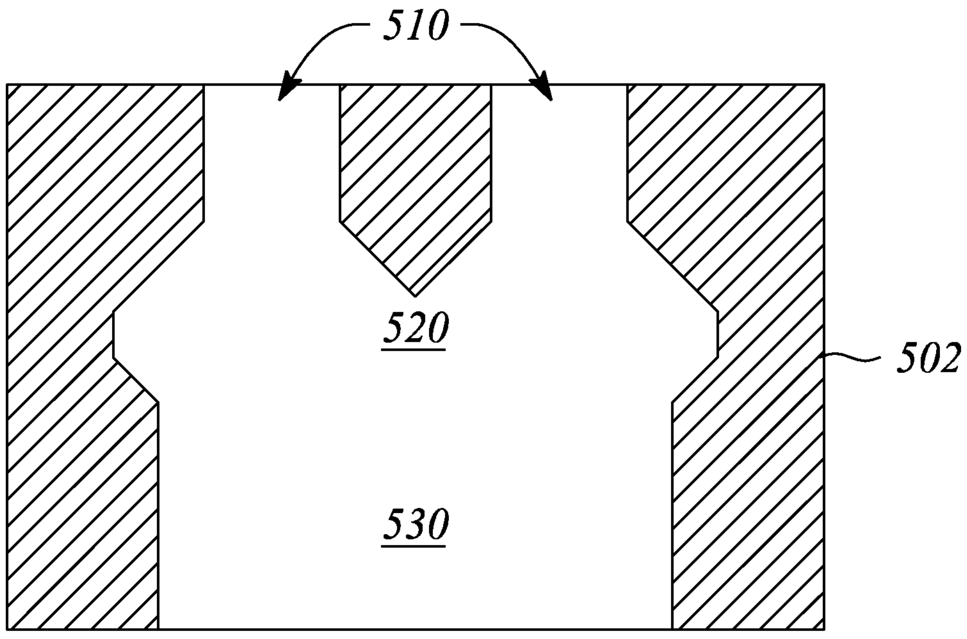
FIG. 5B illustrates a cross sectional view of the exemplary substrate illustrated in FIG. 5A following removal of the etch-stop layer, according to an embodiment of the present invention.

FIG. 5A illustrates a cross sectional view of an exemplary substrate 502 having a cavity 520 and recess 530 separated by an etch-stop layer 540, according to an embodiment of the present invention. For example, forming 110 a cavity may have been used to create the cavity 520 while the illustrated recess 530 may have been provided by forming 150 a recess. As illustrated, an etch-stop layer 540 is exposed to the backside of the substrate 502 by the recess 530. Specifically, an exposed surface 542 of the etch-stop layer 540 is exposed to the backside of the substrate 502 by the recess 530. FIG. 5B illustrates a cross sectional view of the exemplary substrate 502 illustrated in FIG. 5A following removal 160 of the etch-stop layer, according to an embodiment of the present invention. As illustrated, the cavity 520 and recess 530 have been connected by removing 160 the etch-stop layer 540.

In some embodiments (not illustrated), the etch-stop layer may coat more than just a bottom or floor of the cavity. In such embodiments, some of the etch-stop layer may remain on walls of the cavity after removal 160 of the etch-stop layer. In particular, removal 160 of the etch-stop layer need only remove a portion of the etch-stop layer between the cavity and the recess, in some embodiments.

In some embodiments, the method 100 of fabricating a bridge beam further comprises forming 170 circuitry on a surface of the bridge beam. For example, the formed 170 circuitry may comprise a resistive heater that is part of the ejector element of the printhead. The circuitry may further comprise conductive leads that connect the resistor to a voltage or current source, for example. The circuitry may be formed 170 using and according to conventional semiconductor fabrication methods including, but not limited to, evaporative and sputter deposition of materials on a top surface of the bridge beam.

In some embodiments, forming 170 the circuitry is performed prior to forming 120 the pair of trenches, as illustrated in FIG. 1. In other embodiments, forming 170 circuitry may be performed after forming 120 the pair of trenches but prior to applying 130 a protective layer (i.e., as illustrated in FIG. 1). The protection layer may further protect the formed 170 circuitry, for example. In yet other embodiments, forming 170 the circuitry may be performed after one or both of forming 110 a cavity and depositing 140 an etch-stop layer at a bottom of the formed 110 cavity. In yet other embodiments, the circuitry is formed 170 following recess formation 150 or even after removing 160 the exposed etch-stop layer.

In some embodiments, the method of fabricating a bridge beam further comprises creating 180 a bubble expansion chamber and a nozzle above the bridge beam. The bubble expansion chamber and nozzle may be created 180 by depositing one or more layers on the front surface of the substrate above the bridge beam. For example, the deposited layers may comprise a primer and a polymer that are deposited to create 180 the bubble expansion chamber and nozzle. The polymer may be an epoxy-based negative photoresist such as, but not limited to, SU-8, for example. The photoresist SU-8 is manufactured by MircoChem of Newton, Mass. as SU-8 2000 and SU-8 3000 and is also a available from Gersteltec Sárl, Pully, Switzerland, under the product names GM 1040, GM 1060, GM 1070, and GM 1075, for example.

Figure 6:
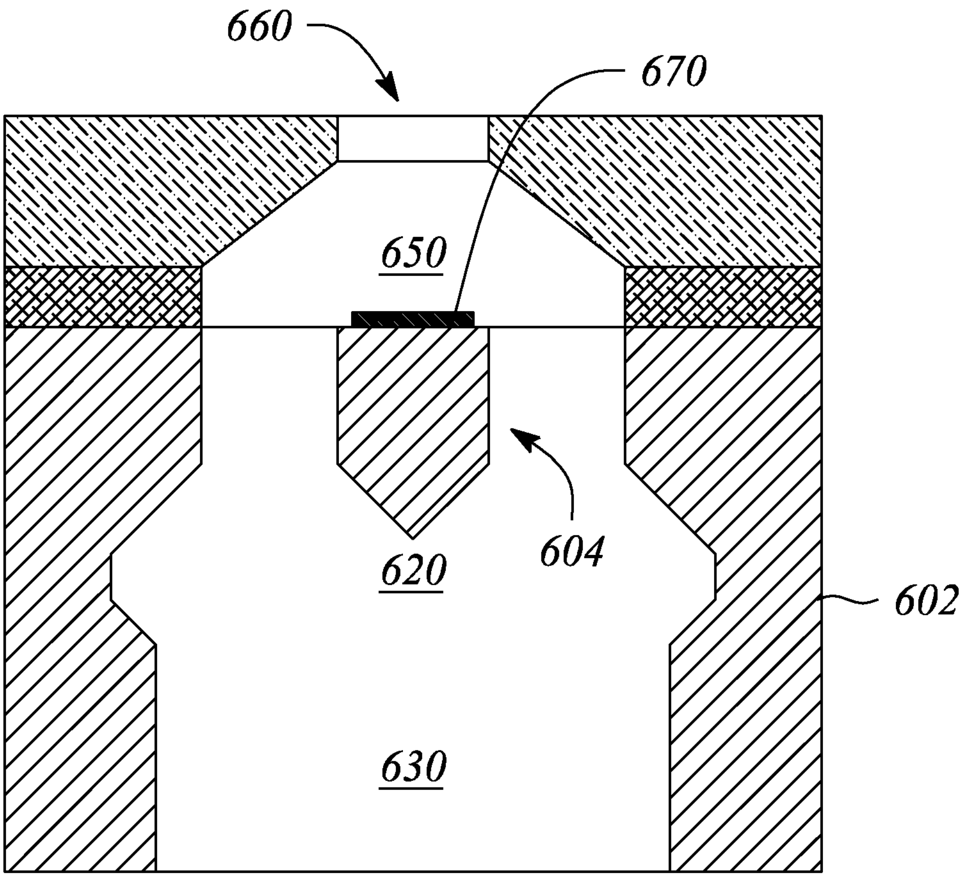
FIG. 6 illustrates a cross sectional view of an exemplary substrate having a bubble expansion chamber and nozzle created above a bridge beam, according to an embodiment of the present invention.

FIG. 6 illustrates a cross sectional view of an exemplary substrate 602 having a bubble expansion chamber 650 and nozzle 660 created 180 above a bridge beam 604, according to an embodiment of the present invention. The combined cavity 620 and recess 630 illustrated below the bridge beam 604 may connect to an ink reservoir (not illustrated), for example. Also illustrated in FIG. 6 is circuitry 670 formed 170 on the bridge beam 604 surface.

Thus, there have been described embodiments of a method of fabricating a bridge beam of an inkjet printhead that employ a buried cavity and etch-stop layer. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A method of fabricating a bridge beam of an inkjet printhead, the method comprising:

forming a cavity that connects between a bottom of a pair of trenches in and extending from a front surface of a substrate;

depositing an etch-stop layer at a bottom of the cavity;

forming a recess in a back surface of the substrate, the recess exposing the etch-stop layer and the etch-stop layer limiting a depth of the formed recess; and removing the exposed etch-stop layer to connect the cavity and the recess, wherein the bridge beam comprises a portion of the substrate above the formed cavity and between the trenches.

2. The method of fabricating a bridge beam of claim 1, further comprising:

forming the pair of trenches; and applying a protection layer to a sidewall of the formed trenches.

3. The method of fabricating a bridge beam of claim 2, wherein forming the pair of trenches comprises using front-side dry etching and wherein applying the protection layer comprises:

applying a conformal thin film to surfaces of the trenches; and selectively removing the applied conformal thin film from a bottom surface of the trenches.

4. The method of fabricating a bridge beam of claim 3, wherein the conformal thin film comprises tetraethyl orthosilicate (TEOS).

5. The method of fabricating a bridge beam of claim 2, further comprising increasing a depth of the formed pair of trenches after applying the protection layer, the depth being increased to expose portions of the trench sidewalls below the protection layer, wherein exposing portions of the trench sidewalls facilitates forming the cavity.

6. The method of fabricating a bridge beam of claim 1, wherein forming the cavity comprises employing a wet etch.

7. The method of fabricating a bridge beam of claim 1, wherein forming the cavity comprises employing an isotropic xenon-difluoride ($XeF_2$) dry etch.

8. The method of fabricating a bridge beam of claim 1, wherein the etch-stop layer comprises tetraethyl orthosilicate (TEOS).

9. The method of fabricating a bridge beam of claim 1, further comprising:

forming circuitry on a surface of the bridge beam; and creating a bubble expansion chamber and a nozzle above the bridge beam.

10. A method of fabricating a bridge beam of an inkjet printhead, the method comprising:

forming a cavity that connects between a bottom of a first trench and a bottom of a second trench, the first and second trenches being spaced apart from one another in a front side of a substrate;

depositing an etch-stop layer on a bottom of the cavity;

forming a recess in a backside of the substrate, the recess exposing the etch-stop layer to the backside; and removing the etch-stop layer to connect the cavity and the recess, wherein the bridge beam comprises a portion of the substrate that remains above the formed cavity and between the first and second trenches.

11. The method of fabricating a bridge beam of claim 10, further comprising:

forming the pair of trenches before forming the cavity; and applying a protection layer to a sidewall of the formed trenches.

12. The method of fabricating a bridge beam of claim 10, wherein forming a cavity comprises employing one of a wet etch and an isotropic dry etch that is performed through the trenches, wherein the protection layer protects the sidewall during cavity formation etching.

13. The method of fabricating a bridge beam of claim 12, wherein the substrate comprises silicon (Si), the wet etch employs tetramethylammonium hydroxide (TMAH) and the isotropic dry etch employs xenon-difluoride ($XeF_2$).

14. The method of fabrication a bridge beam of claim 10, wherein the substrate comprises silicon (Si) and the etch-stop layer comprises tetraethyl orthosilicate (TEOS).

15. A method of fabricating an inkjet printhead having a bridge beam suspended over a buried cavity in a substrate, the method comprising:

forming a pair of spaced apart trenches in the front surface of the substrate, a distance between the spaced apart trenches defining a width of the bridge beam;

applying a protection layer to a sidewall of the formed trenches; and forming the buried cavity that connects a bottom of the pair trenches to one another, wherein forming the buried cavity employs etching of the substrate, the etching being performed through the trenches and wherein the sidewall is protected by the protection layer during etching, depositing an etch-stop layer on a bottom of the buried cavity, the bridge beam comprising a portion of a roof of the buried cavity adjacent to a front surface of the substrate;

forming a back-surface recess extending from a backside of the substrate to the etch-stop layer, forming the back-surface recess being limited by the etch-stop layer, wherein the back-surface recess exposes a portion of the etch-stop layer; and removing the exposed portion of the etch-stop layer to connect the buried cavity and the back-surface recess.

16. The method of fabricating a bridge beam of claim 15, wherein forming the cavity comprises employing an isotropic xenon-difluoride ($XeF_2$) dry etch.

17. The method of fabricating a bridge beam of claim 15, wherein the substrate comprises silicon (Si) and forming the cavity comprises employing a wet etch using tetramethylammonium hydroxide (TMAH).

18. The method of fabricating a bridge beam of claim 15, wherein the substrate comprises silicon (Si) and the etch-stop layer comprises tetraethyl orthosilicate (TEOS).

19. The method of fabricating a bridge beam of claim 15, further comprising:

forming circuitry on a surface of the bridge beam; and creating a bubble expansion chamber and a nozzle above the bridge beam.

* * * * *